July 2, 1935.  G. WIRRER  2,006,613
SUPERCHARGING AND SCAVENGING DEVICE FOR DIESEL ENGINES
Filed Oct. 19, 1933  2 Sheets-Sheet 1
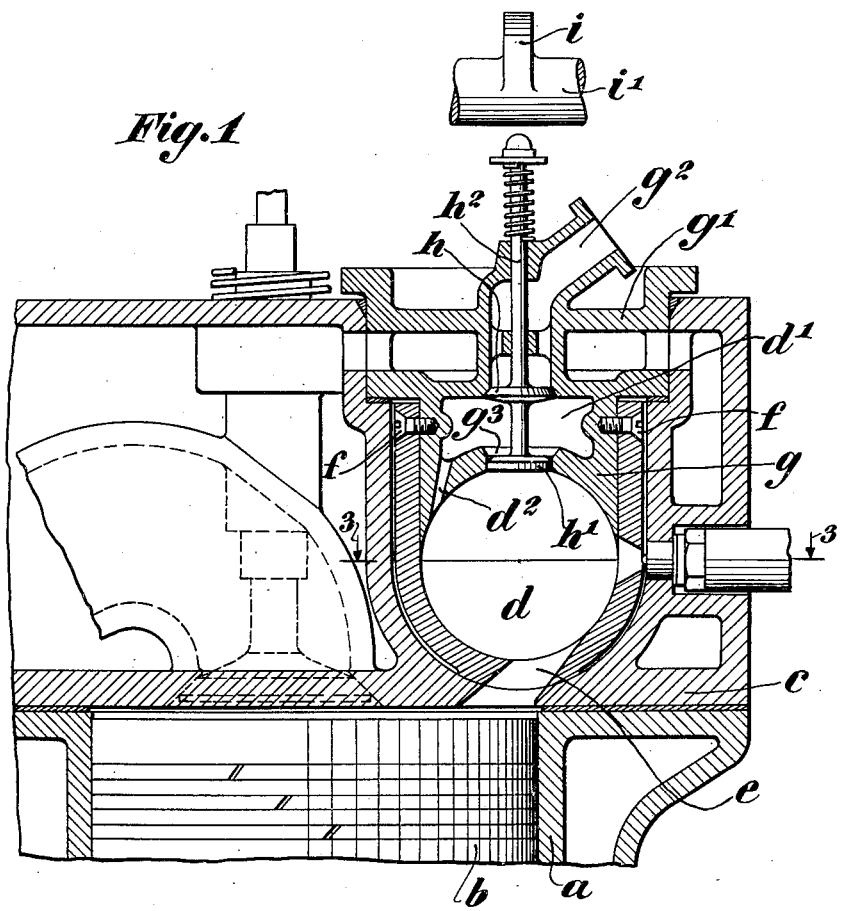
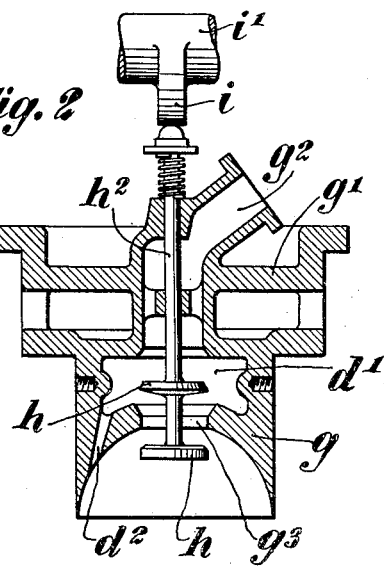
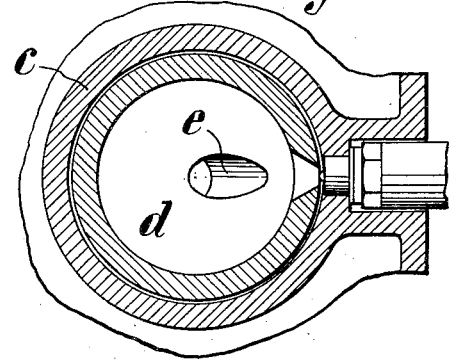
INVENTOR
Gottfried Wirrer,
BY
Redding, Greeley, O'Shea and Campbell
HIS ATTORNEYS

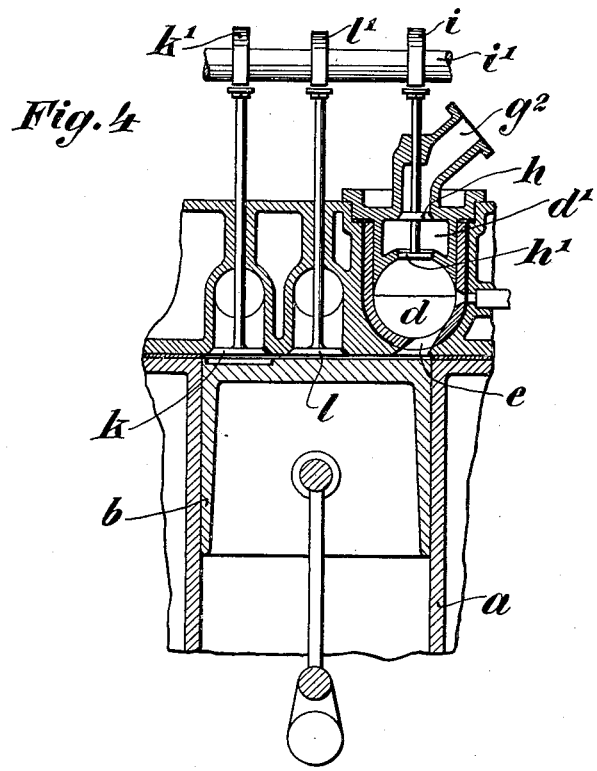
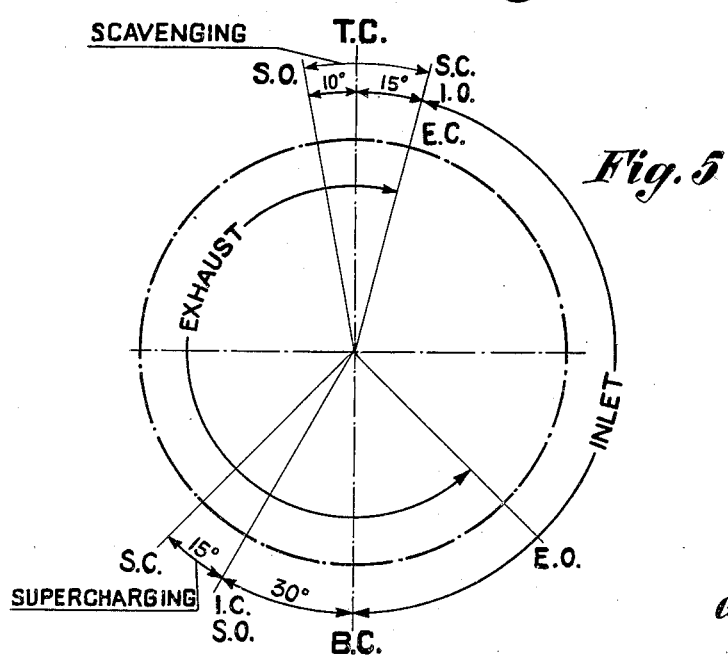

Patented July 2, 1935

2,006,613

UNITED STATES PATENT OFFICE 2,006,613

SUPERCHARGING AND SCAVENGING DEVICE FOR DIESEL ENGINES

Gottfried Wirrer, Plainfield, N. J., assignor to International Motor Company, New York, N. Y., a corporation of Delaware Application October 19, 1933, Serial No. 694,226

2 Claims. (Cl. 123—32)

This invention relates to a device for supercharging and scavenging Diesel engines of the type in which air is drawn into the cylinder by the piston and subsequently forced into a combustion chamber communicating with the cylinder where fuel is injected. The principal object of the invention is to provide a construction in which supercharging and scavenging may be effectively carried on under conditions which will not require the use of complicated structural additions, nor a great volume of the supplemental air. The improved device is so related to the combustion chamber that the supplemental air will scavenge it effectively before entering the cylinder and, when supercharging is provided for the additional air will be introduced into the combustion chamber thus adding to the charge within the cylinder. In the preferred construction the additional air for both scavenging and supercharging is taken from an independent source of air under pressure. By adding the air near the end of the intake stroke of the piston, however, the apparatus for introducing the air at that point need not be of great capacity since it need handle only the additional charge for supercharging.

In accordance with the invention the exhaust and inlet valves and the valve to control the supplemental air may be operated from a single cam shaft in proper timed relation to the end that the scavenging valve may be opened for a brief period to admit air when the piston is near the top of its stroke at the end of the exhaust stroke, and subsequently the scavenging valve may be opened for a brief period when the piston is near the bottom of its intake stroke to add a supplemental charge of air to that taken into the cylinder through the inlet valve.

A practical embodiment of the invention is illustrated in the accompanying drawings, wherein:

Figure 1 is a fragmentary view in vertical section showing the head of a Diesel engine and combustion chamber therein, the improved device being associated therewith.

Figure 2 is a fragmentary detailed view in vertical section showing the improved device in operating condition.

Figure 3 is a horizontal sectional view taken through the combustion chamber shown in Figure 1 along the line 3—3 thereof.

Figure 4 is a fragmentary view in vertical section showing the relation of the inlet, exhaust and supplemental air valves and the operating cam shaft therefor.

Figure 5 is a diagram showing, merely by way of illustration, the timed relations of the operations of the several valves.

The usual parts of an engine are illustrated somewhat conventionally, the cylinder at $a$, the piston at $b$, the water cooled cylinder head at $c$, the combustion chamber at $d$ and the passage between the combustion chamber and the cylinder at $e$. In the preferred form of the invention there is provided in communication with the combustion chamber an air chamber $d'$ which communicates with the combustion chamber through a passageway $d^2$. As shown in the drawings the combustion chamber $d$ is supported by screws $f$ on the depending section $g$ of a water cooled plug $g'$, the air chamber $d'$ being formed within this plug. Centrally of the plug is formed an air passage $g^2$ communicating with the air chamber $d'$. Centrally disposed of the depending member $g$ is formed a port $g^3$ in line with the air passage $g^2$. Movement of air through the passage $g^2$ into the air chamber $d'$ and from thence through the port $g^3$ into the combustion chamber $d$ is controlled by double poppet valves $h$, $h'$, respectively, carried on a vertical stem $h^2$ and operable by a cam $i$ on a cam shaft $i'$ in a manner which will be understood.

Referring now particularly to Figure 4 the exhaust valve is indicated at $k$ and the inlet valve at $l$. For convenience, it may be assumed that the cam shaft $i'$ will carry cams $k'$ and $l'$ to operate the valves $k$ and $l$, respectively, although obviously the invention will not be limited to the mechanical means for bringing about the desired results.

In operation, it will be understood that the piston $b$ draws in a supply of air through the inlet port $l$ and on the compression stroke forces it into the combustion chamber $d$ and a portion into the air chamber $d'$. On the down-stroke of the piston after combustion, the air thus compressed in the chamber $d'$ rushes back through the passage $d^2$ into the chamber $d$ and continues in a path generally tangential to the wall of that chamber so as to maintain turbulence within the burning gases. After the working stroke products of combustion are expelled by the piston. In order to insure complete scavenging it may be desirable to introduce a supplemental air stream at some period before the exhaust valve closes. In accordance with the invention such a stream of air may be introduced through the air passage $g^2$ which may communicate with the inlet manifold or with an independent source of air impelled under pressure. When the double poppet valve $h$, $h'$, is open, as it will be in proper phase relation in the cycle, a scavenging stream of air may be forced through the air chamber $d'$ and combustion chamber $d$ into the cylinder $a$. The scavenging air is thus effective to clean out the combustion space and the remaining products of combustion within the cylinder. When, as is contemplated, supercharging is desirable the air duct $g^2$ will communicate with the independent source of air under pressure. The poppet valves $h$, $h'$, will be opened as the piston $b$ approaches the lower center on the intake stroke at which time the cylinder is substantially filled with air. An additional quantity of air may thus be readily introduced under a relatively low pressure through the air passage $g^2$. The poppet valves $h$, $h'$, will be closed, of course, at the appropriate time after such supercharging and before the compression stroke.

Referring now more particularly to the diagram of Figure 5 the position of the piston at top center is indicated at T. C. while the position of the piston at bottom center is indicated at the point B. C. On the inlet stroke it may be assumed that the valve $l$ will open 15° after top center at the point indicated at I. O., meaning "inlet open." The inlet valve will remain open until the piston passes bottom center and 30° therebeyond at which point the inlet valve may close, that point being indicated on the diagram at I. C. At that instant the scavenging valves $h$, $h'$, may open to introduce an additional charge of air under pressure for supercharging. This point is indicated at S. O. Since the cylinder has already been filled with air it is unnecessary to deliver the full volume of air and accordingly compressors or blowers of large capacity and size need not be employed as heretofore. This supercharging air may be admitted during the piston stroke equivalent to 15° on the crank shaft after which the valves $h$, $h'$, may be closed, this being indicated at S. C. The compression stroke then follows and also the working stroke as usual, all of the valves remaining closed meanwhile. Before the piston reaches bottom center on the working stroke the exhaust valve may open at the point indicated at E. O. The exhaust may remain open until the piston passes top center by 15° at which time the exhaust will close at the point indicated at E. C. While the piston is traveling upward on the exhaust stroke just before it reaches top center the scavenging valves $h$, $h'$ may open at the point indicated at S. O. This point may be about 10° before top center. Scavenging air under pressure will sweep out the products of combustion from the combustion chamber $d$, the space over the piston and the exhaust port, leaving clean air in the air chamber $d'$ and all of the other spaces. When the exhaust valve closes the scavenging valves will also close as indicated at the point S. C. It is to be understood that the various points at which the operations occur may be varied so far as concerns the number of degrees indicated on the diagram, but the invention contemplates that the supercharging will be done at a time when the piston is near the bottom of the inlet stroke and the scavenging will be done when the piston is near the top center. The advantage, as pointed out before is, that the added volume of supplemental air may be relatively low and the means for introducing this additional volume may be correspondingly smaller and simpler.

It will be evident that the simple construction provided will permit ready scavenging and supercharging or it may be used alone to effect either scavenging or supercharging.

What I claim is:

1. In a Diesel engine, in combination with a cylinder, a piston, a combustion chamber communicating with the cylinder to receive a charge of air therefrom on the compression stroke and to discharge the products of combustion to impel the piston on the working stroke, a passage through which air flows from a source independent of the cylinder, an air chamber communicating directly with the combustion chamber and the air passage, and a poppet valve controlling the flow of air from said air passage to the air chamber whereby a supplemental charge of air may be introduced into the combustion chamber independent of the main charge of air inducted into the cylinder.

2. In a Diesel engine, in combination with a cylinder, a cylinder head, a piston, a plug in the head, the plug and head having cooling ducts formed therein, a combustion chamber depending from the plug and communicating with the cylinder, an air passage in the plug adapted to receive air from a source independent of the cylinder, an air chamber in the plug communicating directly with the combustion chamber and with the air passage, an independent air inlet port and an exhaust port communicating directly with the cylinder, valves to control said ports, and means to close the air passage in the plug and to open the said air passage to introduce a charge of air under pressure when the piston is near the bottom of the inlet stroke.

GOTTFRIED WIRRER.